US005910289A

United States Patent [19]

Sagstetter

[11] Patent Number: 5,910,289

[45] **Date of Patent: *Jun. 8, 1999**

[54] DEVICE FOR COLLECTING A BLOOD SAMPLE FROM A PLASTIC SEGMENT TUBE

[75] Inventor: William E. Sagstetter, Denver, Colo.

[73] Assignee: Medical Safety Products, Inc., Englewood, Colo.

[ * ] Notice: This patent is subject to a terminal disclaimer.

[21] Appl. No.: 08/951,440

[22] Filed: Oct. 15, 1997

Related U.S. Application Data

[63] Continuation-in-part of application No. 08/612,093, Mar. 7, 1996, Pat. No. 5,714,125.

[51] Int. Cl.[6] .................... G01N 1/10

[52] U.S. Cl. .................... 422/102; 422/99; 422/100; 128/763; 128/764; 128/770; 436/177; 436/180; 73/864.01; 73/864.02; 604/110; 604/202

[58] Field of Search .................... 422/99, 72, 100, 422/101, 102, 104; 128/763, 764, 770; 436/177, 180; 73/864.01, 864.02; 604/110, 202

[56] References Cited

U.S. PATENT DOCUMENTS

| | | | |
|---|---|---|---|
| 3,648,684 | 3/1972 | Barnwell et al. | 128/2 F |
| 4,003,262 | 1/1977 | Gerarde et al. | 73/425 |
| 4,176,451 | 12/1979 | McMorrow | 30/124 |
| 4,263,922 | 4/1981 | White | 128/763 |
| 4,367,749 | 1/1983 | Dudley et al. | 128/637 |
| 4,392,497 | 7/1983 | Ghaussy | 128/637 |
| 4,441,951 | 4/1984 | Christinger | 156/245 |
| 4,840,185 | 6/1989 | Hernandez | 128/763 |
| 4,886,072 | 12/1989 | Percarpio et al. | 128/763 |
| 4,972,843 | 11/1990 | Brodén | 128/760 |
| 4,976,925 | 12/1990 | Porcher et al. | 422/100 |
| 5,125,058 | 6/1992 | Tenerz et al. | 385/66 |
| 5,254,312 | 10/1993 | Staebler et al. | 422/100 |
| 5,286,453 | 2/1994 | Pope | 422/100 |
| 5,313,969 | 5/1994 | Hsieh | 128/764 |
| 5,393,674 | 2/1995 | Levine et al. | 436/177 |

FOREIGN PATENT DOCUMENTS 0350792 1/1990 European Pat. Off. .

OTHER PUBLICATIONS

"Introducing the SEG–SAFE™ Segment Processor", Alpha Scientific Corp., Southeastern, PA (1995).

"Directions for Using SegmentSampler™", Gamma Biologicals, Houston, TX (Nov. 1994).

*Primary Examiner*—Harold Y. Pyon

*Attorney, Agent, or Firm*—Dorr, Carson, Sloan & Birney, P.C.

[57] ABSTRACT

A device for collecting a blood sample from a plastic segment tube into a receptacle uses a cylindrical housing containing a hollow needle to puncture the segment tube as it is inserted into the upper port of the device. A series of ribs with medial edges are arranged in a radial pattern around the needle within the upper port to guide and support the segment tube as it is inserted. The ribs are separated by slots that also guide the sealed end of the segment tube. An annular recess around the lower port of the device holds the rim of the receptacle and allows blood released by the punctured segment tube to drain into the receptacle. The annular recess accommodates a wide range of test tube diameters, and exerts only a downward force on the rim of the receptacle when a segment tube is inserted into the upper port of the device.

22 Claims, 6 Drawing Sheets

Fig. 1
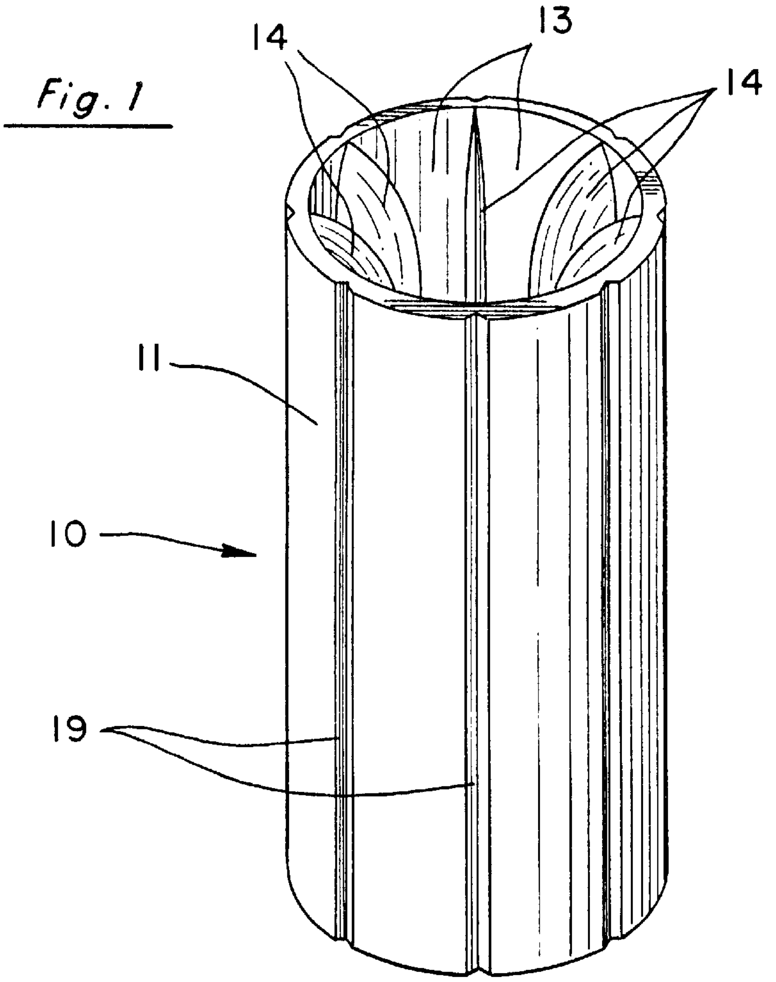
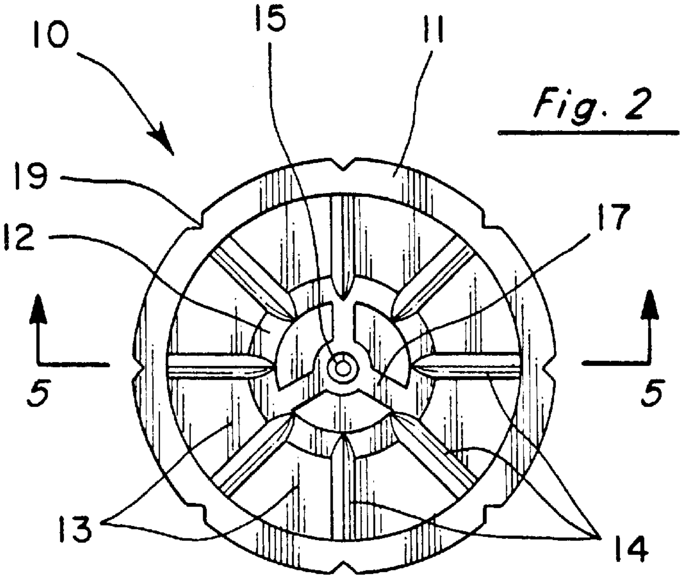
Fig. 2

Fig. 8
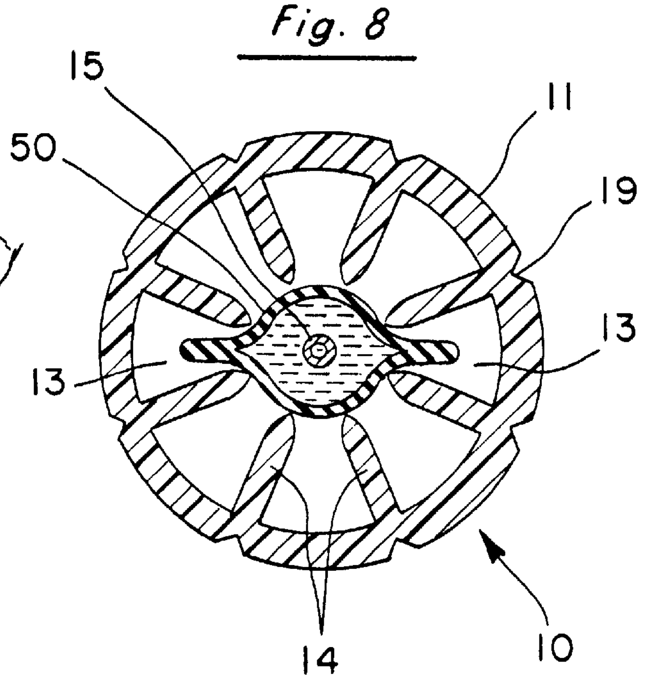
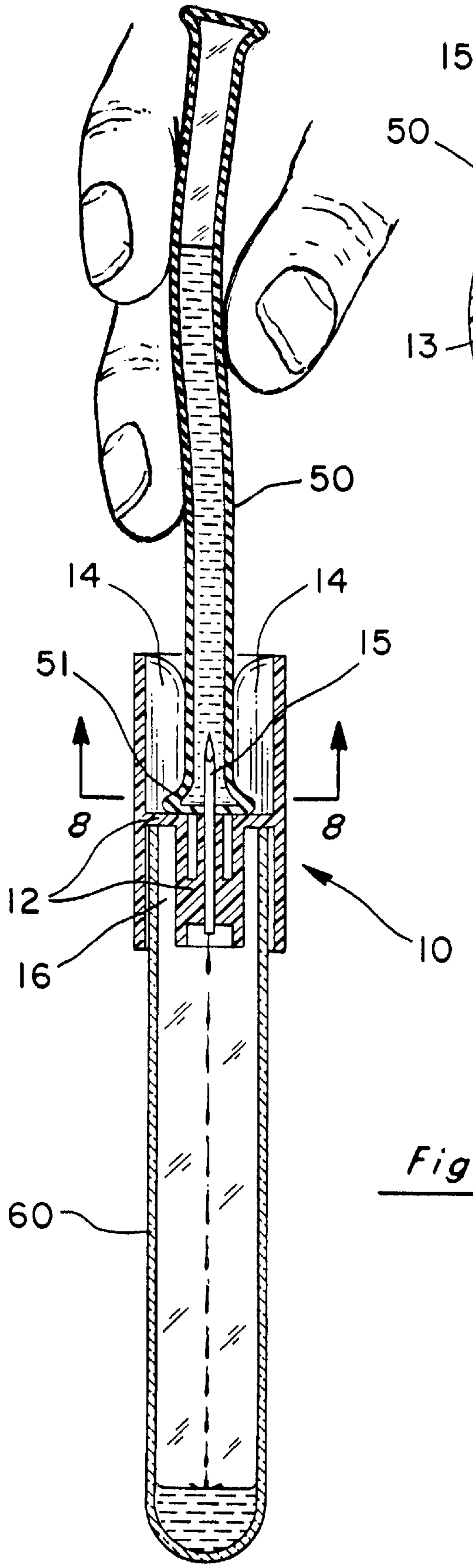
Fig. 7

Fig. 12
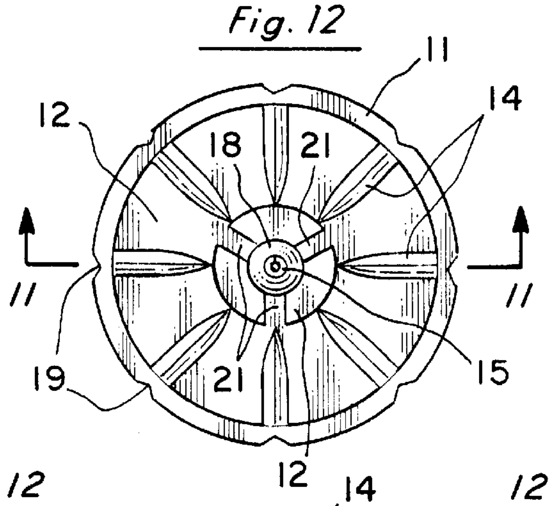
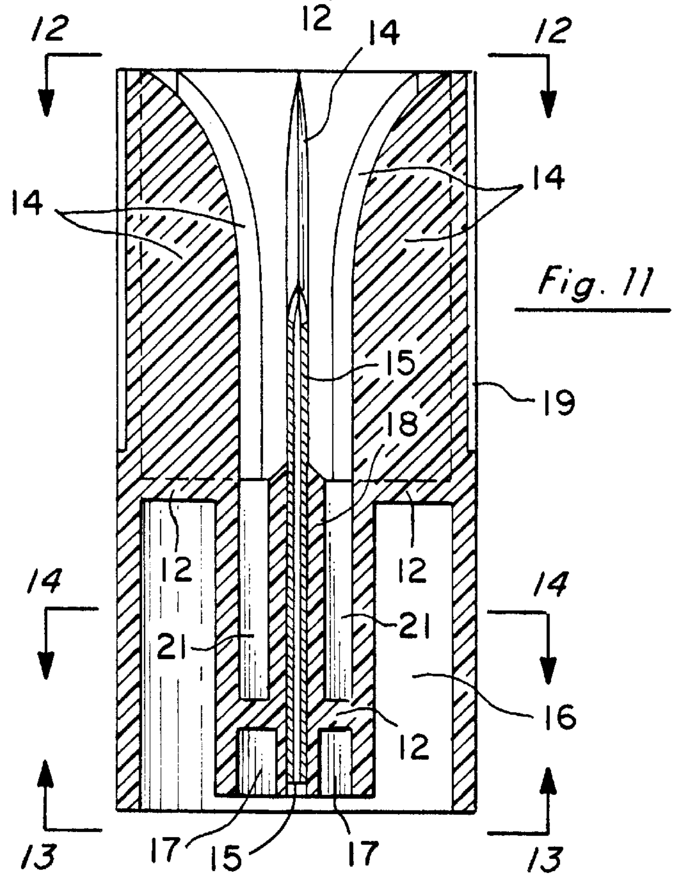
Fig. 11
Fig. 14
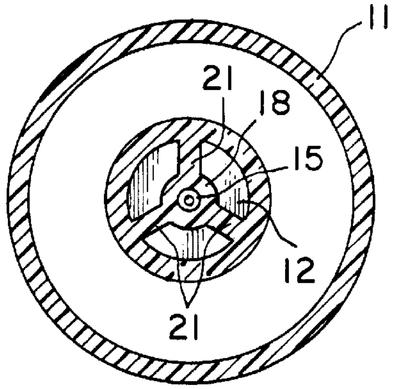
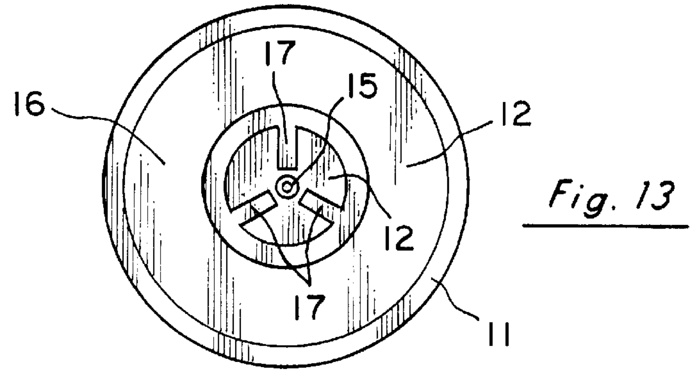
Fig. 13

DEVICE FOR COLLECTING A BLOOD SAMPLE FROM A PLASTIC SEGMENT TUBE

RELATED APPLICATION

The present application is a continuation-in-part of the Applicant's U.S. patent application Ser. No. 08/612,093, entitled "Device For Collecting A Blood Sample From A Plastic Segment Tube", filed on Mar. 7, 1996, now U.S. Pat. No. 5,714,125.

BACKGROUND OF THE INVENTION

1. Field of the Invention

The present invention relates generally to the field of devices for collecting blood samples. More specifically, the present invention discloses a device for safely piercing a plastic segment tube to release a blood sample into a receptacle for subsequent testing.

2. Statement of the Problem

Donated blood is widely used for transfusions to assist patients suffering trauma and during surgery. A soft plastic bag called a blood collection bag is used for gathering blood from the donor. The blood collection bag is connected to a flexible plastic tube and a needle at the distal end of the plastic tube is penetrated into the donor's vein. Blood flows through the needle and tube into the blood collection bag. After the desired quantity of blood has been collected in the blood collection bag, the needle is withdrawn and the tube is heat sealed into a series of segments containing the donor's blood.

Prior to transfusion, each unit of blood must be tested to ensure that it is compatible with the patient's blood type. This is commonly referred to as a "type and cross-match" procedure. In addition, donated blood is often tested for the presence of infectious agents, such as hepatitis viruses and HIV. However, blood samples cannot be obtained directly from the blood collection bag, because of potential contamination of the blood that may occur from contact with a syringe or pipette used to withdraw a sample.

As a result of this problem, the conventional approach has been to heat seal a number of short segments of the plastic tube leading from the donor's arm to the blood collection bag. These sealed tube segments are commonly referred to as segment tubes, pigtails, or segments. The segment tubes are made of soft plastic that can easily bend or buckle. The segment tubes remain attached to the blood collection bag, and are often folded into a group held together with a rubber band. Blood is typically tested shortly after it has been donated, and again immediately before transfusion. In both cases, the laboratory technician simply removes one of the segment tubes attached to the blood collection bag for testing. The customary technique is to use a pair of surgical scissors to cut the segment tube in half at the junction between the sedimented red blood cells and plasma in the blood sample within the segment tube. The section of the segment tube containing the red blood cells is then squeezed to force cells into a test tube for subsequent testing.

This current technique has a number of shortcomings and potential hazards. The segment tube may be under internal pressure, which can cause blood to spray outward when the segment tube is cut. This can expose the technician and work surfaces in the laboratory to potential blood contamination. The scissors also become contaminated with blood, and could cause transmission of blood-borne infectious disease to health care workers, particularly if the technician experiences an injury from sharp edges associated with the scissors. The scissors are often reused without cleaning or sterilization after cutting through a segment tube. This further increases the dissemination of blood-borne microorganisms to work surfaces and drawers where scissors are stored after use. The surface of the donor blood bag can also become contaminated with blood by laying the bag on contaminated work surfaces, or by technicians touching the bag with blood-contaminated gloves or hands. The blood-contaminated blood bag might then contaminate other hospital environments, such as operating rooms and patient areas. Again, this could potentially increase nosocomial and health care worker infection rates from blood contamination (e.g., staphylococcal, streptococcal, hepatitis B and C infections). Finally, failure to clean the scissors between samples could cause subsequent blood samples to be contaminated with trace amounts of blood from preceding samples. This can lead to inaccurate cross-matching, with subsequent safety concerns for patients requiring transfusions. Furthermore, this problem could unnecessarily increase the time and cost for cross-matching and delay transfusion of blood to patients in life-threatening emergencies.

A number of devices have been invented in the past for piercing segment tubes, including the following:

| Inventor | Patent No. | Issue Date |
|---|---|---|
| Staebler et al. | 5,254,312 | Oct. 19, 1993 |
| McMorrow | 4,176,451 | Dec. 4, 1979 |
| Minase et al. | EPO Publ. 0350792 | Jan. 17, 1990 |

"Introducing the SEG-SAFE™ Segment Processor", Alpha Scientific Corp., Southeastern, Pa. (1995)

"Directions for Using SegmentSampler™," Gamma Biologicals, Inc., Houston, Tex. (Nov. 1994).

Staebler et al. disclose a device for collecting a blood sample from a segment tube. The main body of the device has a cup like portion that is inserted into a test tube. The user then inserts a segment tube into the cup like portion of the device and exerts a downward force to enable a piercing element (i.e., a blade or lance) to puncture the segment tube, thereby allowing blood to flow from the segment tube into the test tube. This device is marketed by Innovative Laboratory Acrylics, Inc., of Brighton, Mich., under the name "I.L.A. Safety Segment Slitter."

McMorrow discloses a segment tube cutter with a tapered lower end 8 that is inserted into the test tube 6. A sharp spur 10 cuts the segment tube 11 as it is inserted into the device.

Minase et al. disclose another example of a device for piercing segment tubes. The tubular portion 2 of the device is inserted into a test tube. A cutting edge or needle at the bottom of the tubular portion pierces the segment tube as it is inserted. A hole 7 allows blood to drain from the segment tube into the test tube.

The literature distributed by Alpha Scientific Corp. shows a temporary receptacle for processing segment tubes that includes a needle to puncture the segment tube.

The "SegmentSampler" device marketed by Gamma Biologicals, Inc., is generally similar to that disclosed by Minase et al. However, the lower tubular portion of the device is tapered to accommodate a range of test tube diameters.

The prior art devices fail to address many of the technical and safety issues associated with obtaining a blood sample from a segment tube. An ideal blood sampling device should address the following concerns:

(a) The type and cross-match procedure is commonly performed using any of several different test tubes diameters. It is important that the device be able to accommodate different test tube diameters. In particular, the device should not exert forces on the neck of the test tube as the segment tube is punctured that might cause the test tube to break.

(b) There are no accepted industry standards for the diameter and thickness of the plastic tubing leading to the blood collection bag. Therefore, the device should be able to accommodate different segment tube diameters.

(c) Segment tubes are heat-sealed using at least three different heat-sealing devices that result in different shapes and thicknesses of the heat-sealed ends of segment tubes. In addition, each segment tube has two distinct diameters. The sealed ends have a major dimension larger than the diameter of the body of the segment tube. This further complicates the dimensional variations among the various types of segment tubes. A device with a cylindrical opening to receive the segment tube will tend not to provide a particularly good fit, and may not adequately guide and support the segment tube. The device should be able to accommodate sealed ends having a wide range of dimensions without exerting radial forces on the test tube.

(d) The segment tube should not be allowed to fold or buckle as it is inserted into the device.

(e) The device should not have an opening that restricts insertion of the segment tube to a particular orientation to accommodate the flat sealed end of the segment tube.

(f) The device should minimize contact between the user's fingers and the glass test tube.

(g) The device should prevent contact between the user's fingers and the puncturing element within the device.

(h) After the segment tube has been punctured, the user should not have direct contact with the punctured end of the segment tube to minimize blood splatter and contamination. The device should retain the punctured segment tube so that both can be discarded together.

(i) Considerable downward force may be necessary to puncture the segment tube. The device should provide sufficient structural support to maintain proper orientation for the puncturing element, and to prevent the puncturing element from bending or being dislodged.

(j) If adhesive is used to bond the needle to the device, the adhesive should not be permitted to plug the needle and thereby interfere with drainage of blood from the segment tube through the needle into the test tube.

(k) It is also important to minimize the dispersal of any blood remaining in the device after the segment tube and device have been discarded. Blood tends to remain within the needle and droplets of blood accumulate at the bottom of the device. These droplets of blood can easily become dislodged when the device is discarded and contaminate the surrounding environment.

Thus, the "SegmentSampler" device marketed by Gamma Biologicals, Inc., has a number of shortcomings when compared against the above list of desired features. In particular, the tapered side walls of the SegmentSampler device create radial pressure if used with smaller test tubes (e.g., 10 mm and 12 mm) that can cause the test tube to break when a relatively small downward force is exerted on the device. Also, the SegmentSampler device is not well suited to receive segment tubes having a wide range of diameters and shapes. Wider segment tubes and those with larger sealed ends create an interference fit that can exert radial pressure on the wall of the test tube and break the test tube when the user pushes downward on the segment tube. This device also provides little structural support for the needle. Hence, the segment tube can bend the needle sideways, preventing puncture of the segment tube. The segment tube could also buckle or fold upon itself without being punctured.

The device disclosed by Staebler et al. has many of the same shortcomings. In addition, this device uses a solid lancet to puncture the segment tube that also plugs the opening in the segment tube, and thus interferes with the flow of blood into the test tube. Also, the device requires that the flat end of the segment tube be inserted at a predetermined orientation to allow the lancet to pierce the wall of the segment tube.

3. Solution to the Problem

None of the prior art references uncovered in the search show a device having the structure of the present invention. In particular, the present device has a port for receiving the end of the segment tube that includes a plurality of tapered ribs arranged in a radial pattern with slots interspersed between each adjacent pair of ribs. This configuration allows the device to handle a wide range of segment tube diameters and a wide variance in the dimensions of sealed ends. The medial edges of the ribs create a passageway with a smaller diameter for guiding and supporting the tubular portion of the segment tube so that it does not fold or buckle, thereby enabling the segment tube to present onto the puncturing element. Multiple slots allow the sealed end of the segment tube to be inserted in any orientation. The larger dimensions of the slots allow the larger, sealed end of the segment tube to be inserted without causing folding or bending of the segment tube. The ribs also help to retain the segment tube after it has been punctured so that the device and segment tube can be discarded together.

The segment tube is punctured by the needle above the level of the test tube, and therefore never enters the test tube. As a result, no outward radial forces are exerted on the test tube as the segment tube is inserted into the device.

An annular recess in the bottom of the device accommodates a wide range of test tube diameters without creating radial stresses that might break the test tube. The annular recess contacts only the top rim of the test tube and only a downward force is exerted on the rim of the test tube when a segment tube is inserted into the device. The lower portion of the device housing serves as a protective skirt covering the rim and upper portion of the test tube to protect the user's fingers if the test tube breaks.

In addition, the needle is held firmly in place by a horizontal divider 12, sleeve 18, and a series of lower radial ribs 21 (see FIG. 11). This additional structural support minimizes deflection of the needle when the segment tube is inserted. The lower ribs 17 below the divider 12 increase capillary attraction of blood that may remain at the bottom of the device after the segment tube has been punctured, so that blood droplets are less likely to contaminate the surrounding environment after the test tube is removed and the device is discarded.

SUMMARY OF THE INVENTION

This invention provides a device for collecting a blood sample into a receptacle from a plastic segment tube. A cylindrical housing contains a hollow needle that punctures the segment tube as it is inserted into the upper port of the device. A series of ribs with medial edges are arranged in a radial pattern around the needle within the upper port to guide and support the segment tube as it is inserted. The ribs are separated by slots that also guide the sealed end of the segment tube. An annular recess around the lower port of the device holds the rim of the receptacle and allows blood released by the punctured segment tube to drain into the receptacle. The annular recess accommodates a wide range of test tube diameters, and exerts only a downward force on the rim of the receptacle when a segment tube is inserted into the upper port of the device.

A primary object of the present invention is to provide a device for collecting a blood sample from a segment tube that can accommodate a wide range of segment tube sizes, segment tube end shapes, and test tube diameters.

Another object of the present invention is to provide a device for collecting a blood sample from a segment tube that does not exert radial forces on the test tube that might cause the test tube to break.

Another object of the present invention is to provide a device for collecting a blood sample from a segment tube that guides and supports both the tubular portion and sealed end of the segment tube as they are inserted to prevent the segment tube from folding or buckling.

Another object of the present invention is to provide a device for collecting a blood sample from a segment tube that includes a protective skirt covering the rim and upper portion of the test tube to protect the user's fingers in case the test tube breaks.

Yet another object of the present invention is to provide a device for collecting a blood sample from a segment tube that includes sufficient structural support to prevent the needle from being deflected by the segment tube.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1 is a top perspective view of the present device 10.

FIG. 2 is a top view of the device 10.

FIG. 7 is a side cross-sectional view of the device 10 on a test tube 60 after a segment tube 50 has been inserted into the device 10.

FIG. 8 is a cross-sectional view of the device 10 and segment tube 50 corresponding to FIG. 7 taken through a horizontal plane extending through the needle 15 of the device 10 and the lower end of the segment tube 50.

FIG. 11 is a cross-sectional view of another alternative embodiment of the device 10.

FIG. 12 is a top view of the alternative embodiment of the device 10 corresponding to FIG. 11.

FIG. 13 is a bottom view of the alternative embodiment of the device 10 corresponding to FIG. 11.

FIG. 14 is another cross-sectional view of the alternative embodiment of the device 10 corresponding to FIG. 11.

DETAILED DESCRIPTION OF THE INVENTION

Figure 3:
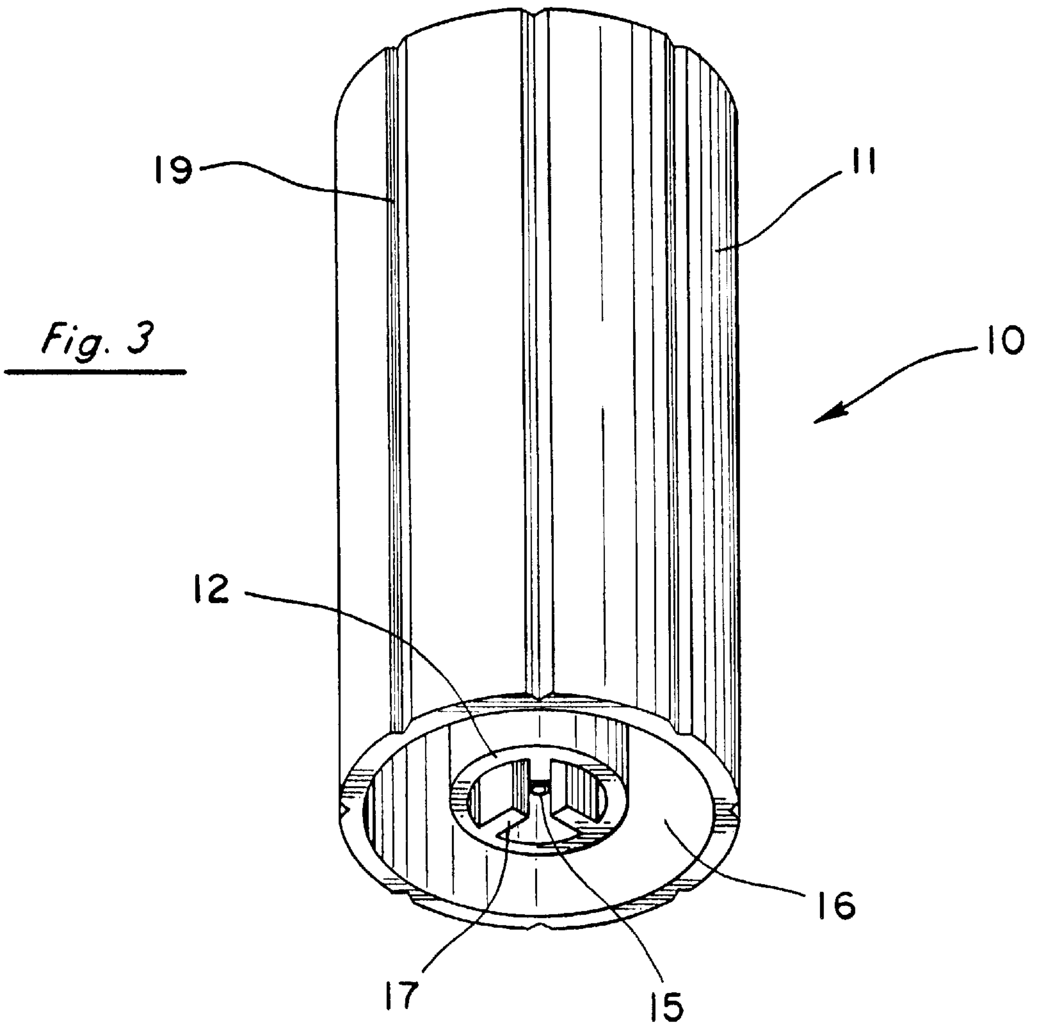
FIG. 3 is a bottom perspective view of the device 10.
Figure 4:
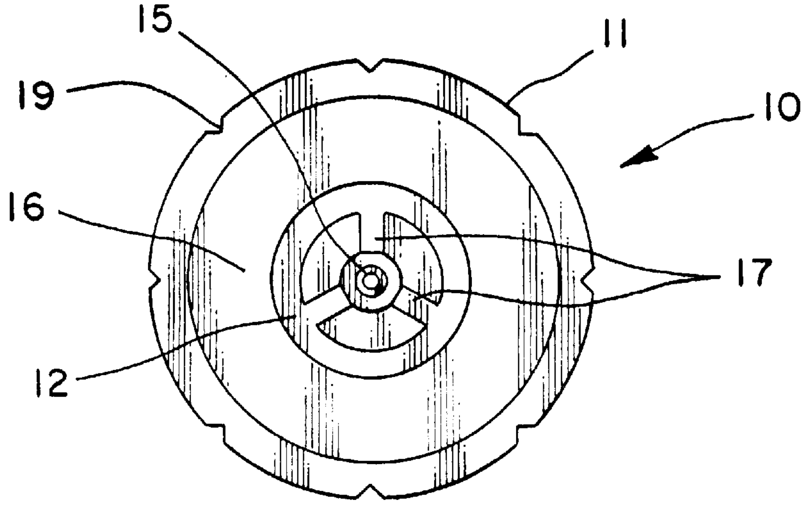
FIG. 4 is a bottom view of the device 10.
Figure 5:
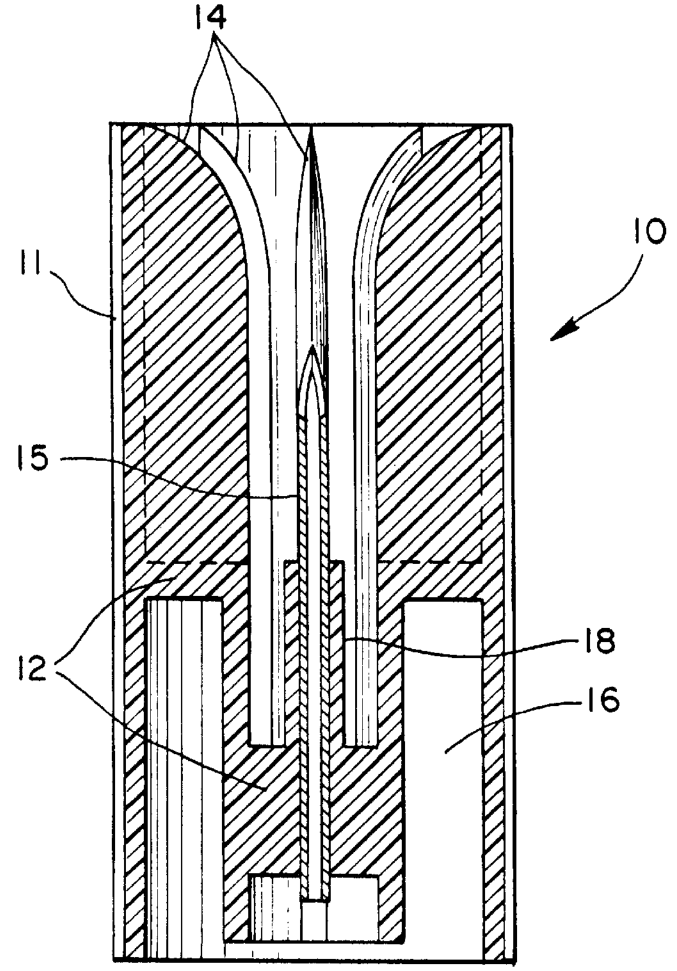
FIG. 5 is a side cross-sectional view of the device 10.

Turning to FIG. 1, a top perspective view is shown of the entire device 10. A corresponding top view is illustrated in FIG. 2. The device 10 has a generally cylindrical housing 11 having an upper port and a lower port. A bottom perspective view is provided in FIG. 3 and a corresponding bottom view is provided in FIG. 4 showing the lower port of the device 10. FIG. 5 is a side cross-sectional view of the entire device 10. The housing 11 includes a series of vertical grooves 19 to provide a better grip for the user's fingers.

Figure 6:
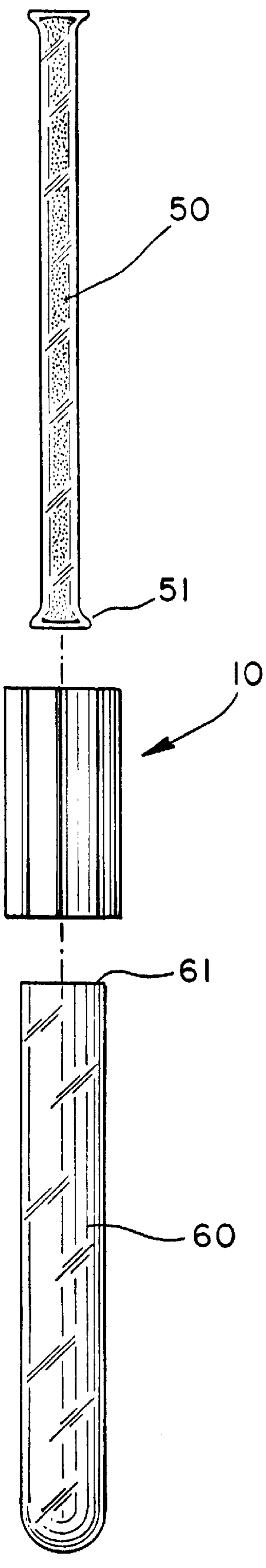
FIG. 6 is an exploded side elevational view of a segment tube 50, the device 10, and a test tube 60.

As illustrated in FIG. 6, the lower port of the device 10 is first placed over a test tube 60 (or other receptacle) intended to receive the blood sample. A segment tube 50 is then inserted into the upper port of the device. The tubular portion of the segment tube 50 is typically made of flexible plastic that is relatively easy to bend or buckle, as illustrated in FIG. 7. The ends of the segment tube 50 are heat sealed, which results in a crimped or flattened end 51 having dimensions that are larger than the smaller diameter of the tubular portion of the segment tube 50.

A series of ribs 14 are arranged in a radial pattern about a hollow needle 15 within the upper portion of the housing 11. The ribs 14 have tapered medial edges surrounding the needle 15 that define an unobstructed passageway leading downward from the upper port to the needle 15. This vertical passageway has relatively large cross-sectional dimensions at the upper port that progressively reduce to smaller cross-sectional dimensions adjacent to the needle 15. In the preferred embodiment, the passageway is a tapered vertical column having a generally circular cross-section with an effective diameter adjacent to the needle 15 that results in a friction fit with the smaller diameter of the tubular portion of the segment tube 50. Thus, the medial edges of the ribs 14 serve to guide and support the tubular portion of the segment tube 50 as it is inserted into the upper port of the device 10 and punctured by the needle 15. The ribs 14 also help to prevent the tubular portion of the segment tube 50 from folding or buckling, and help to prevent accidental contact by the user with the sharp point of the needle 15.

Slots or spaces 13 between each pair of adjacent ribs 14 catch, align, guide, and support the sealed end 51 of the segment tube 50 as it is inserted so that the segment tube 50 is punctured by the needle 15. In particular, the slots 13 guide and support the larger dimensions of the sealed end 51 of the segment tube, while the medial edges of the ribs 14 guide and support the smaller diameter of the tubular portion of the segment tube 50.

In the preferred embodiment, the slots 13 are radially arranged in diametrically opposed pairs, so that the sealed end 51 of the segment tube 50 can be inserted in any orientation about the vertical axis and yet engage one of the pairs of slots 13, as shown in FIG. 8. In addition, the ribs 14 and slots 13 guide the segment tube 50 into a vertical position if it is initially inserted at a tilt.

A floor or divider 12 separates the upper port of the device 10 from the lower port. The base of the hollow needle 15 is held by and extends upward through the divider 12, thereby providing a passageway to allow blood to drain from the punctured segment tube 50 through the lower port of the device and into the receptacle 60. The sharp upper point of the needle 15 remains shielded within the housing 11 to prevent accidental contact by the user with the point of the needle 15. A sleeve 18 supports the lower portion of the needle 15 to prevent bending or buckling. It should also be expressly understood that other means could be substituted for puncturing the segment tube 50. For example, a solid needle, sharp spur, or blade could be used with a separate conduit through the divider 12 to allow blood to drain into the receptacle 60.

The lower port includes an annular recess 16 that receives the rim 61 of the test tube 60. The width of this annular recess 16 can be made quite substantial to accommodate a wide range of test tube diameters. The lower portion of the cylindrical housing 11 serves as a skirt covering the upper portion of the test tube. This provides support to prevent the device 10 from accidentally flipping or sliding off the test tube 60. The lower portion of the housing 11 also helps to protect the user's fingers and hand from sharp edges in the event the test tube 60 breaks. It should be expressly understood that other means could be used to temporarily mount the device 10 on the test tube rim 61. For example, a circular recess or mechanical fasteners could be employed to attach the device 10 to a test tube 60.

The present device 10 could also be used without a test tube 60 or other receptacle. For example, the device could be used to obtain a blood specimen directly onto a slide for a blood smear. Optionally, the annual recess 16 could be completely eliminated.

The base of the needle 15 is surrounded by a series of lower ribs 17 arranged in a radial pattern on the underside of the divider 12. The exposed surface area of the lower ribs 17 adjacent to the base of the needle 15 provides capillary attraction for any remaining droplets of blood after the test tube 60 is removed, and thereby reduces the risk of contamination to the surrounding area. Furthermore, the lower ribs 17 protrude below the base of the needle 15, as shown in FIG. 3, and prevent the user's hand or fingers from accidentally coming into contact with the base of the needle 15.

In the preferred embodiment, the needle 15 extends upward from the center of the divider 12 along the vertical axis of the housing 11. The annular recess 16 is also centered about this common vertical axis. As the segment tube 50 is inserted into the upper port of the device 10, the slots 13 guide and support the sealed end 51 of the segment tube 50 so that it is punctured by the needle 15. The ribs 14 guide and support the smaller diameter of the tubular portion of the segment tube 50. Axial alignment of the upper port, needle 15, and annular recess 16 ensures that only downward forces of any significant magnitude are exerted on the rim 61 of the test tube 60. It should also be noted that the segment tube 50 is punctured by the needle 15 above the level of the rim of the test tube 60, as shown in FIG. 7. The segment tube 50 never enters the test tube 60. As a result, no radial forces are exerted on the test tube 60 as the segment tube 50 is inserted into the device 10. This feature allows a wide range of test tube diameters to be used without concern of whether the segment tube 50 (or its sealed end 51) will fit into the test tube 60.

After the segment tube 50 has been punctured, blood drains from the segment tube 50 through the hollow needle 15 into the receptacle 60, as shown in FIG. 7. The device 10 is then removed from the receptacle 60, and the device 10 and segment tube 50 are discarded together. As previously mentioned, the medial edges of the ribs 14 create a friction fit with the tubular portion of the segment tube 50. The needle 15 also tends to retain the punctured segment tube 50. These frictional forces help to keep the device 10 and segment tube 50 together when they are discarded, and thereby minimize contamination of the surrounding area.

Figure 10:
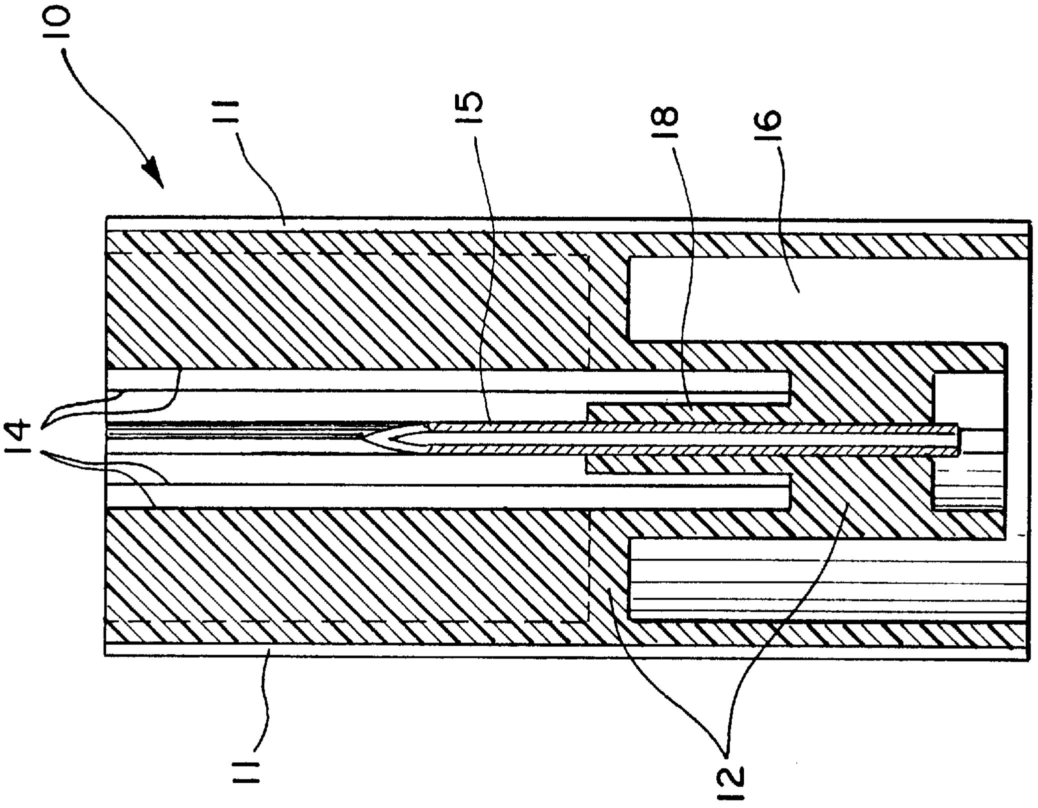
FIG. 10 is a side cross-sectional view of the alternative embodiment of the device 10 corresponding to FIG. 9.
Figure 9:
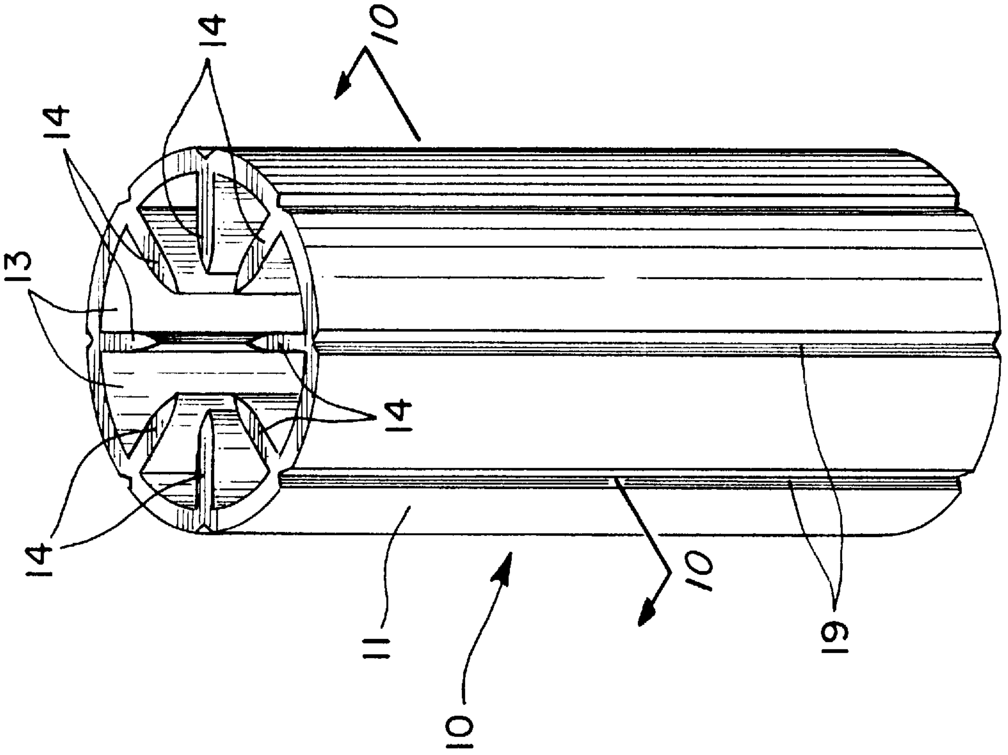
FIG. 9 is a top perspective view of an alternative embodiment of the present device 10.

FIGS. 9 and 10 are top perspective and cross-sectional views, respectively, depicting an alternative embodiment of the present invention in which the medial edges of the ribs 14 are straight and vertical, unlike the tapered medial edge shown in FIGS. 1 and 5. This would not necessarily be the preferred embodiment because it could be more difficult to insert the segment tube 50 into the device 50 due to the lack of tapering.

FIGS. 11 through 14 illustrate another alternative embodiment in which the divider 12 has a different configuration. In this embodiment, the sleeve 18 surrounding the base of the needle 15 is further reinforced by a second set of upper ribs 21 extending from the divider 12 to the sleeve 18.

As before, a series of lower ribs 17 surround, but do not touch the base of needle 15 below the divider 12. The exposed surface area of the lower ribs 17 adjacent to the base of the needle 15 provides capillary attraction for any remaining droplets of blood after the test tube 60 is removed, and thereby reduces the risk of contamination to the surrounding area. The lower ribs 17 extend downward below the base of the needle 15, as shown in FIG. 11, to prevent the user from accidentally coming into contact with the base of the needle 15.

The base of the needle 15 is secured to the sleeve 18 and the remainder of the device by adhesive during the manufacturing process. The lower ribs 17 tend to trap any excess adhesive on the base of the needle during manufacturing to help prevent the base of the needle from becoming obstructed.

The above disclosure sets forth a number of embodiments of the present invention. Other arrangements or embodiments, not precisely set forth, could be practiced under the teachings of the present invention and as set forth in the following claims.

I claim:

1. A device for collecting a blood sample from a flexible segment tube having a tubular portion and sealed ends, said device comprising:

- a housing;
- a plurality of ribs defining a passageway within said housing for guiding and supporting the tubular portion of a segment tube;
- puncturing means within said passageway for puncturing the segment tube and allowing blood released by the punctured segment tube to drain from said housing; and
- a plurality of slots separated by said ribs, said slots extending outward from said passageway for engaging and guiding the sealed end of the segment tube so that the segment tube is punctured by said puncturing means.

2. The device of claim 1 wherein said ribs extend in a substantially radial pattern about said puncturing means.

3. The device of claim 1 wherein said ribs further comprise tapered medial edges surrounding said puncturing means for supporting and guiding the tubular portion of the segment tube as the segment tube is inserted into the device.

4. A device for collecting a blood sample in a receptacle from a flexible segment tube, said receptacle having an opening with a rim, said segment tube having a tubular portion and sealed ends, said device comprising:

- a housing having an upper port for receiving a segment tube and a lower port for receiving the rim of a receptacle;
- puncturing means within said upper port of said housing for puncturing the segment tube and allowing blood released by the punctured segment tube to drain from said lower port into the receptacle; and
- a plurality of ribs within said upper port separated by slots, said ribs defining a passageway extending from said upper port for guiding and supporting the tubular portion of the segment tube, said slots having dimensions larger than said passageway for engaging and guiding the sealed end of the segment tube so that the segment tube is punctured by said puncturing means.

5. The device of claim 4 wherein said ribs extend in a substantially radial pattern about said puncturing means.

6. The device of claim 4 wherein said ribs further comprise tapered medial edges surrounding said puncturing means for supporting and guiding the tubular portion of the segment tube as the segment tube is inserted into the device.

7. The device of claim 4 wherein said puncturing means comprise a hollow needle having a sharp point within said upper port and a base open to said lower port.

8. The device of claim 4 wherein said lower port comprises an annular recess for receiving the rim of the receptacle.

9. The device of claim 4 wherein a lower portion of said housing comprises a skirt extending over the rim of the receptacle.

10. The device of claim 4 further comprising a divider within said housing separating said upper port from said lower port.

11. The device of claim 10 wherein said puncturing means comprise a hollow needle having a sharp point within said upper port and a base held by and extending through said divider into said lower port.

12. The device of claim 11 further comprising a plurality of lower ribs on said divider supporting said needle.

13. The device of claim 11 further comprising a plurality of lower ribs extending downward below said base of said needle.

14. A device for collecting a blood sample in a receptacle from a flexible segment tube having a tubular portion and sealed ends, said receptacle having a rim about its upper opening, said device comprising:

a housing with a port for receiving a segment tube;

puncturing means within said port for puncturing the segment tube and allowing blood released by the punctured segment tube to drain into the receptacle;

a plurality of ribs within said port separated by slots, said ribs defining a passageway extending from said port for guiding and supporting the tubular portion of the segment tube, said slots having dimensions larger than said passageway for engaging and guiding the sealed end of the segment tube so that the segment tube is punctured by said puncturing means; and mounting means for removably attaching said housing to the rim of the receptacle, said puncturing means being located above the rim of the receptacle so that only substantially downward forces are exerted on the rim of the receptacle when the segment tube is inserted into said port of said housing.

15. The device of claim 14 wherein said mounting means comprise an annular recess in said housing.

16. The device of claim 14 wherein said ribs extend in a substantially radial pattern about said puncturing means.

17. The device of claim 14 wherein said ribs further comprise tapered medial edges surrounding said puncturing means for supporting and guiding the tubular portion of the segment tube as the segment tube is inserted into the device.

18. A device for collecting a blood sample in a receptacle from a flexible segment tube, said receptacle having an opening with a rim, said segment tube having a tubular portion and sealed ends, said device comprising:

a housing having an upper port for receiving a segment tube and a lower end;

an annular recess in said lower end of said housing for receiving the rim of a receptacle;

a divider within said housing separating said upper port from said annular recess;

a hollow needle having a sharp point within said upper port and a base extending through said divider for puncturing the segment tube and allowing blood released by the punctured segment tube to drain into the receptacle; and a plurality of ribs separated by slots arranged in a radial pattern about said needle within said upper port, said ribs defining a passageway extending from said upper port for guiding and supporting the tubular portion of the segment tube, said slots having dimensions larger than said passageway for engaging and guiding the sealed end of the segment tube so that the segment tube is punctured by said needle.

19. The device of claim 18 wherein said ribs further comprise tapered medial edges surrounding said puncturing means for supporting and guiding the tubular portion of the segment tube as the segment tube is inserted into the device.

20. The device of claim 18 further comprising a plurality of lower ribs on said divider supporting said needle.

21. The device of claim 18 further comprising a plurality of lower ribs extending downward below said base of said needle.

22. The device of claim 18 wherein a lower portion of said housing comprises a skirt extending over the rim of the receptacle.

* * * * *